(12) United States Patent  (10) Patent No.: US 8,834,150 B2
Schmidt  (45) Date of Patent: Sep. 16, 2014

(54) VALVE GATE CYLINDER AND HOUSING WITH MICROGAP SEAL

(71) Applicant: Mold Hotrunner Solutions Inc., Georgetown (CA)

(72) Inventor: Harald Schmidt, Georgetown (CA)

(73) Assignee: Mold Hotrunner Solutions Inc., Georgetown (CA)

( * ) Notice: Subject to any disclaimer, the term of this patent is extended or adjusted under 35 U.S.C. 154(b) by 115 days.

(21) Appl. No.: 13/647,434

(22) Filed: Oct. 9, 2012

(65) Prior Publication Data

US 2014/0099398 A1 Apr. 10, 2014

(51) Int. Cl.
 *B29C 45/22* (2006.01)
(52) U.S. Cl.
 USPC .......................... 425/564; 425/566; 425/572
(58) Field of Classification Search
 USPC .......................... 425/564, 566, 572
 See application file for complete search history.

(56) References Cited

U.S. PATENT DOCUMENTS

| | | | |
|---|---|---|---|
| 4,213,751 A | 7/1980 | Fernandez | |
| 4,832,593 A | 5/1989 | Brown | |
| 5,635,227 A | 6/1997 | Whisenhunt et al. | |
| 6,464,909 B1 * | 10/2002 | Kazmer et al. | 425/564 |
| 6,555,044 B2 | 4/2003 | Jenko | |
| 6,683,283 B2 | 1/2004 | Schmidt | |
| 7,147,458 B2 | 12/2006 | Schmidt | |
| 7,467,941 B2 | 12/2008 | Jenko | |
| 7,997,895 B1 | 8/2011 | Schmidt | |
| 8,047,836 B2 | 11/2011 | Schmidt | |

* cited by examiner

*Primary Examiner* — Tim Heitbrink
(74) *Attorney, Agent, or Firm* — McMillan LLP

(57) ABSTRACT

An injection molding arrangement including a mold top clamp plate having a means for receiving a plasticizer unit, a manifold retainer plate supporting a melt distribution manifold having a melt distribution channel into which melt from the plasticizer unit is received, a mold cavity plate provided such that the manifold retainer plate is positioned between the mold top clamp plate and the mold cavity plate; the mold cavity plate receiving an injection nozzle in fluid communication with the melt distribution channel for receiving melt to be injected into a mold, a valve gate stem extending into the injection nozzle and axially movable between an open position permitting melt flow and a closed position blocking melt flow, and an actuator for moving the valve gate stem between the open position and the closed position. The actuator includes a cylinder chamber receiving a piston therein, with the valve gate stem coupled to the piston. The piston has an elongate cylindrical sidewall. The cylinder chamber and the piston are sized and otherwise dimensioned to provide a microgap seal along the uninterrupted elongate cylindrical sidewall between an upper chamber of the cylinder chamber and a lower chamber of the cylinder chamber.

19 Claims, 4 Drawing Sheets

VALVE GATE CYLINDER AND HOUSING WITH MICROGAP SEAL

FIELD OF THE INVENTION

The invention relates to the field of mold arrangements and assemblies for injection molding systems, and more specifically, to a valve gate cylinder and housing with a microgap piston seal.

BACKGROUND OF THE INVENTION

Injection molding assemblies, for the manufacture of large parts generally require very high flow rates of melt to fill the mold quickly. Hotrunner mold nozzles have been used in many applications of this type, and typically have a valve gated nozzle to control the injection of melt from a plasticizer unit and into the mold. Various gate valves are known in the prior art and are often hydraulically or pneumatically operated to move a valve stem axially between a position in which the flow of melt is permitted and a position in which the flow of melt is prevented at a gate orifice proximate or integral with an injection apparatus. The gate valves themselves generally include a piston-cylinder arrangement to move the valve stem.

Due in part to the high operating temperatures within the mold (often times a melt temperature between 300-400 degrees Celsius and a mold temperature of 100-200 degrees Celsius), the piston and cylinder mechanisms are located away from the melt channel, which is heated and has high temperature melt flowing therethrough. Having the piston and cylinder exposed to the high temperatures typically required for melt flow can lead to the piston sealing ring to fail. Thus, a distance must be kept between the cylinder-piston mechanism and the injection apparatus, or otherwise thermal insulation of some sort is required. As will be appreciated by one skilled in the art, having to locate the cylinder and piston at a distance from the injection apparatus results in a larger than ideal mold arrangement. Furthermore, the valve stem becomes more prone to failure and must itself be made larger than would otherwise be preferred.

Various other valve gates are known in the prior art that attempt to improve the sealing of the piston-cylinder arrangement. These include U.S. Pat. No. 4,213,751 issued Jul. 22, 1980 to Fernandez, U.S. Pat. No. 7,467,941 issued Dec. 23, 2008 to Jenko, U.S. Pat. No. 6,555,044 issued Apr. 29, 2003 to Jenko and U.S. Pat. No. 5,635,227 issued Jun. 3, 1997 to Whisenhunt et al.

All of the solutions in these prior art patents show the use of seals variably located within the piston-cylinder arrangement. Most of the seals must be located a distance from the injection apparatus and from the melt channel in the melt distribution manifold due to the high operating parameters at play, and in addition, the piston-cylinder chamber must often be insulated from this heat or even cooled. As is widely known, in the presence of excessive heat, the piston seals can fail.

Another solution that has been attempted in the prior art in order to keep the piston, cylinder and seal in close proximity to the heated melt channel is to use a high temperature sealing device, such as a cast iron piston ring to be used. Many attempts at using cast iron sealing rings have had an unacceptable high rate of leakage. Typically, compressed air has passed from one side of the seal to the other because the ring is split to permit assembly. One example of the use of a cast iron sealing ring that attempts to solve this prior art problem is shown in U.S. Pat. No. 4,832,593 issued May 23, 1989 to Brown. The background section of Brown also describes other attempted solutions to this problem, and problems associated therewith.

All of these prior art solutions also make maintenance fairly difficult as access to the seals for inspection and/or replacement requires significant disassembly of the gate valve and any portions of the manifold holding the gate valve. The Jenko '044 patent attempts to address some of the difficulties in maintenance by providing a removable backplate (column 6, lines 39-42), but still requires that the cylinder be removed, and access be provided to the valve. This patent also addresses other ways of reducing the operating temperature within the cylinder such that less costly seals can be used over a longer life span.

Some prior art solutions also add cooling channels to keep the cylinders cooled below their uncooled operating temperatures. These cooling channels add a degree of complexity to the mold arrangement and increase the manufacturing costs required. In addition, these cooling channels are not failsafe, and mineral deposits in the cooling channel can result in insufficient cooling. There is also an operational issue where the cooling system is not activated by an operator. For example, when injecting molding PEEK, a mold temperature of about 180 degrees Celsius is required and a melt temperature of about 400 degrees Celsius. Typical elastomeric seals, such as Viton™ seals will shrink and fail after repeated exposure to these temperatures. Furthermore, lubricants used with such seals degrade as well. Typical high volume molds run in the order of 4-5 million injection cycles per year. In this environment, the seals become the Achilles heel of the mold and degradation or failure of seals or lubrication results in significant downtime.

Some prior art valve stem cylinders show cylinder integrated or attached cooling channels and cooling fittings with pipes to keep the cylinder seals and the lubricant below a degradation temperature and cold enough to ensure an operating life over month or years. However even with coolant the seals will age and wear out and the lubricant will dissipate and causing preventative maintenance issues or failure. Another problem arises when the coolant (chilled water) clogs the cooling bores with rust, contamination, calcium or other mineral deposition (hard water) or the cooling is not getting activated due to mold operator failure. For example the industry uses flouroelastomer seals that offer a maximum operating temperature of 200 degrees Celsius over a short time period. Most hot runner manifold operating conditions exceed the 200 degrees Celsius mark of up to 400 deg Celsius manifold temperature. A traditional valve stem cylinder assembly will malfunction due to the failure of elastomer seals if not cooled.

There is therefore a need in the art for a gate valve for use in an injection molding apparatus that is less sensitive to operating temperature than the prior art solution, or does not require the cylinder and piston to be located distant from the injection apparatus, and/or improves upon the maintenance requirements of prior art solutions.

SUMMARY OF THE INVENTION

According to one embodiment of the invention, there is provided an injection molding arrangement including a mold top clamp plate having a means for receiving a plasticizer unit, a manifold retainer plate supporting a melt distribution manifold having a melt distribution channel into which melt from the plasticizer unit is received, a mold cavity plate provided such that the manifold retainer plate is positioned between the mold top clamp plate and the mold cavity plate; the mold cavity plate receiving an injection nozzle in fluid communication with the melt distribution channel for receiving melt to be injected into a mold, a valve gate stem extending into the injection nozzle and axially movable between an open position permitting melt flow and a closed position blocking melt flow, and an actuator for moving the valve gate stem between the open position and the closed position. The actuator includes a cylinder chamber receiving a piston therein, with the valve gate stem coupled to the piston. The piston has an elongate cylindrical sidewall, that may be uninterrupted or may have one or more machined grooves therein. The cylinder chamber and the piston are sized and otherwise dimensioned to provide a microgap seal along the uninterrupted elongate cylindrical sidewall between an upper chamber of the cylinder chamber and a lower chamber of the cylinder chamber.

According to one aspect of this embodiment, the microgap seal provides for a distance between the piston and a wall of the cylinder chamber of less than 10 microns.

According to another aspect of this embodiment, there is provided a bore extending from the mold top clamp plate through the manifold retainer plate for receiving the actuator therein.

According to another aspect of this embodiment, wherein the cylinder chamber is provided in a chamber housing having a closed top end and an open bottom end; and further comprising a housing cap for enclosing the bottom end thereby defining the lower chamber between the housing cap and a bottom surface of the piston; the housing cap having a valve bore for which the valve gate stem can pass through.

According to another aspect of this embodiment, the housing includes a first air passage for receiving and evacuating pressurized gas into and out of the upper chamber; and the housing cap includes a second air passage for receiving and evacuating pressurized gas into and out of the lower chamber.

According to another aspect of this embodiment, there is further provided a stand-off between the bottom end of the housing and the housing cap; the housing cap including a boss portion extending into an interior of the stand-off.

According to another aspect of this embodiment, the melt distribution channel includes a first channel portion perpendicular to an axis of the valve gate stem and a second channel portion co-axial with the axis of the valve gate stem; and wherein a stem bore is provided in the melt distribution manifold such that the valve gate stem extends into the stem bore and into the second channel portion to the injection nozzle.

According to another aspect of this embodiment, there is provided a third microgap seal between the valve gate stem and the stem bore.

According to another aspect of this embodiment, the piston includes a top boss portion having a seat for receiving a stop portion of the valve gate stem and a boss cap for enclosing the stop portion within the top boss potion; wherein the valve gate stem floats within the top boss portion.

According to another aspect of this embodiment, the cylinder comprises a cylinder bore through which the valve gate stem extends out of the cylinder chamber.

According to another embodiment of the invention, there is provided a valve gate for use in an injection molding arrangement having an injection nozzle for injecting melt into a mold; the valve gate including a valve gate stem extending into the injection nozzle and axially movable between an open position permitting melt flow and a closed position blocking melt flow, and an actuator for moving the valve gate stem between the open position and the closed position. The actuator includes a cylinder chamber receiving a piston therein, with the valve gate stem coupled to the piston. The piston has an elongate cylindrical sidewall, that may be uninterrupted or may have one or more machined grooves therein. The cylinder chamber and the piston are sized and otherwise dimensioned to provide a microgap seal along the uninterrupted elongate cylindrical sidewall between an upper chamber of the cylinder chamber and a lower chamber of the cylinder chamber.

According to one aspect of this embodiment, the microgap seal provides for a distance between the piston and a wall of the cylinder chamber of less than 10 microns.

According to another aspect of this embodiment, the cylinder chamber is provided in a chamber housing having a closed top end and an open bottom end; and further comprising a housing cap for enclosing the bottom end thereby defining the lower chamber between the housing cap and a bottom surface of the piston; the housing cap having a valve bore for which the valve gate stem can pass through.

According to another aspect of this embodiment, the housing includes a first air passage for receiving and evacuating pressurized gas into and out of the upper chamber; and the housing cap includes a second air passage for receiving and evacuating pressurized gas into and out of the lower chamber.

According to another aspect of this embodiment, there is provided a stand-off between the bottom end of the housing and the housing cap; the housing cap including a boss portion extending into an interior of the stand-off; and further comprising a second microgap seal between an interior surface of the stand-off and the boss portion.

According to another aspect of this embodiment, the piston comprises a top boss portion having a seat for receiving a stop portion of the valve gate stem and a boss cap for enclosing the stop portion within the top boss potion; wherein the valve gate stem floats within the top boss portion.

According to another aspect of this embodiment, the cylinder comprises a cylinder bore through which the valve gate stem extends out of the cylinder chamber.

Various non-limiting embodiments of the invention will be described hereinbelow with reference to the attached drawings in which:

DETAILED DESCRIPTION OF THE PREFERRED EMBODIMENTS

Broadly, the invention relates to a valve gate for use in an injection molding arrangement, or in the alternative, to an injection molding arrangement including elements that when provided in combination operate as a valve gate. The arrangement described below is particularly suitable to stack mold arrangements, or other mold arrangements. As will be appreciated by one skilled in the art in view of the described embodiments that follow, the arrangement eliminates or substantially reduces the need to use seals when a piston-cylinder apparatus is used as an actuator to move a valve gate stem between open and closed positions to permit or block the flow of melt from a nozzle into a mold.

Figure 1:
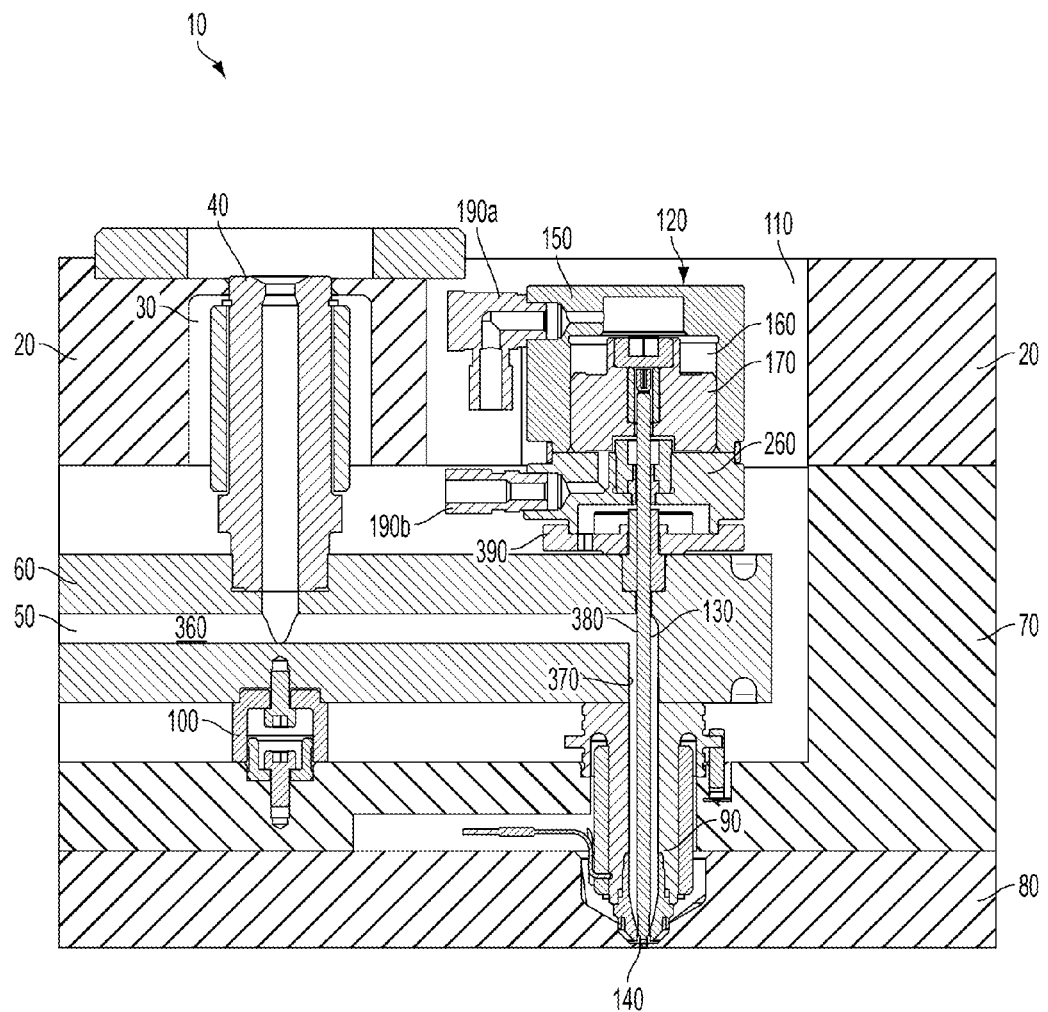
FIG. 1 is a sectional view of a mold arrangement according to one embodiment of the invention.

Referring now to FIG. 1, there is shown one embodiment of an injection molding arrangement in which the valve gate of the invention may be used, and is preferably applicable. As illustrated, there is shown an injection molding arrangement 10 including a mold top clamp plate 20 having a means for receiving 30 a plasticizer unit nozzle 40. The plasticizer unit, and its nozzle 40 are generally known in the art and not described herein in further details. The means for receiving 30 typically includes a receptacle, opening or other access area by which the nozzle 40 can provide melt to a melt distribution channel 50 provided in melt distribution manifold 60. The melt distribution manifold 60 may be supported in the mold arrangement 10 by a manifold retainer plate 70. Finally, a mold cavity plate 80 is sized and otherwise dimensioned to receive an injection apparatus 90 therein. The injection apparatus 90 is in fluid communication with the melt distribution channel 50 for receiving melt from the plasticizer unit nozzle 40, through the melt distribution channel 50 and into the injection apparatus 90. The manifold retainer plate 70 also acts as a stand-off between the mold cavity plate 80 and the mold top clamp plate 20, such that the mold distribution manifold 60 can be positioned therebetween to provide a flow of melt from a side portion thereof. In this manner, the melt distribution channel 50 is kept distal from an actuator of the valve gate, as will be described below. Supporting the melt distribution manifold 60 may be a stand-off spacer 100 that positions and maintains the melt distribution manifold 60 in place, and spaced appropriately such that the injection apparatus 90 is suitably positioned in the mold cavity plate 80. As is known in the art, the injection apparatus 90 injects melt into a mold (not shown) for forming the part being injection molded.

The mold top clamp plate 20 has an opening 110 therein for receiving the valve gate 120. The opening 110 provides for easy access to the valve gate 120 from a top portion of the injection molding arrangement 10, in the event maintenance or inspection is required.

Figure 2:
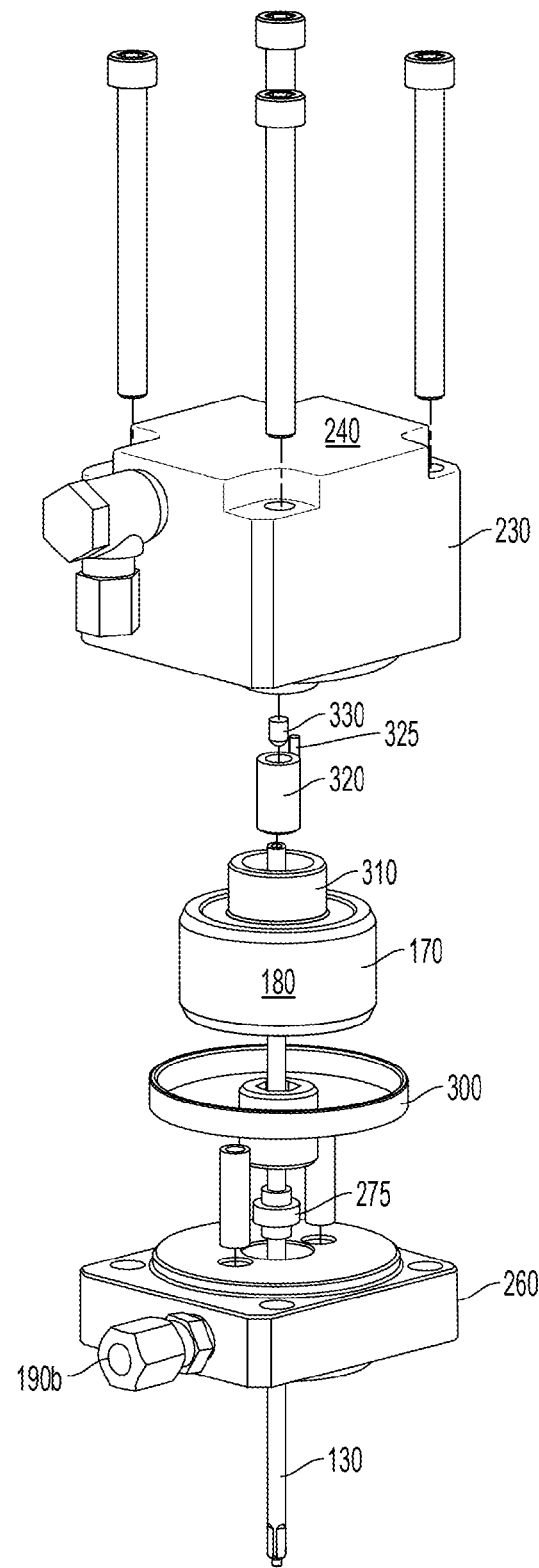
FIG. 2 is an exploded view of the valve gate assembly used in the mold arrangement of FIG. 1.
Figure 3:
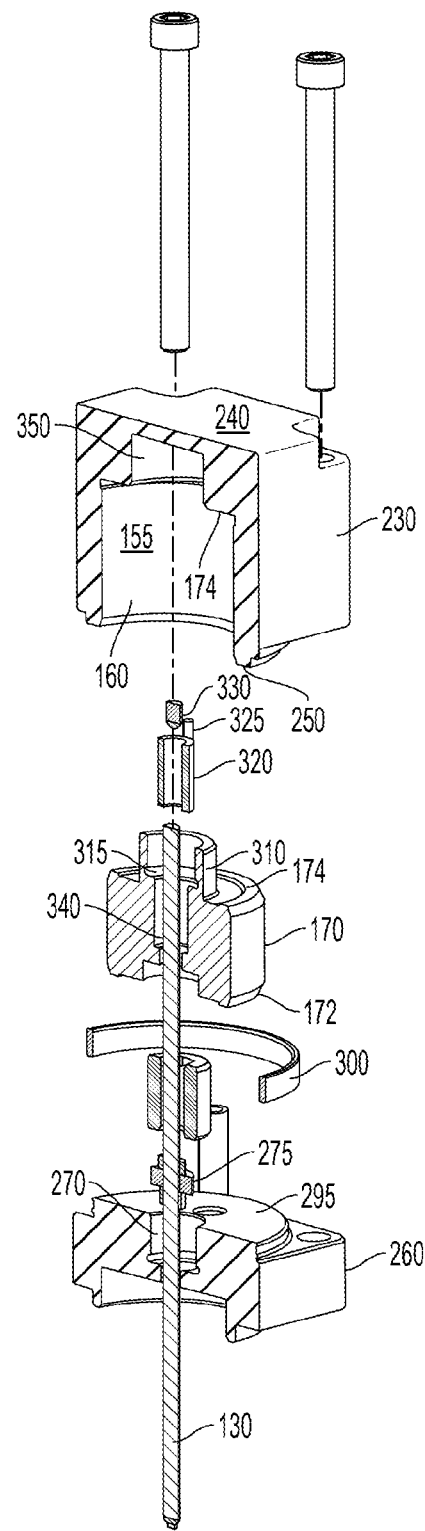
FIG. 3 is a sectional exploded view of the assembly of FIG. 2.

FIGS. 2 and 3 show the preferred valve gate in detailed exploded views and can now be referred to, in combination with FIG. 1 for better understanding the invention. Generally, the valve gate 120 includes a valve gate stem 130 extending into the injection nozzle 90. The valve gate stem 130 is axially movable between an open position permitting melt flow, and a closed position blocking melt flow. The valve gate stem 130, when in the closed position, extends to block on outlet 140 of the injection nozzle 90, as is generally known and described in the prior art references cited in the background above. An actuator 150 moves the valve gate stem 130 between the open and closed positions and may include a cylinder chamber 160 receiving a piston 170 therein. The valve gate stem 130 is coupled to the piston, preferably floatingly coupled as will be described below.

Figure 4:
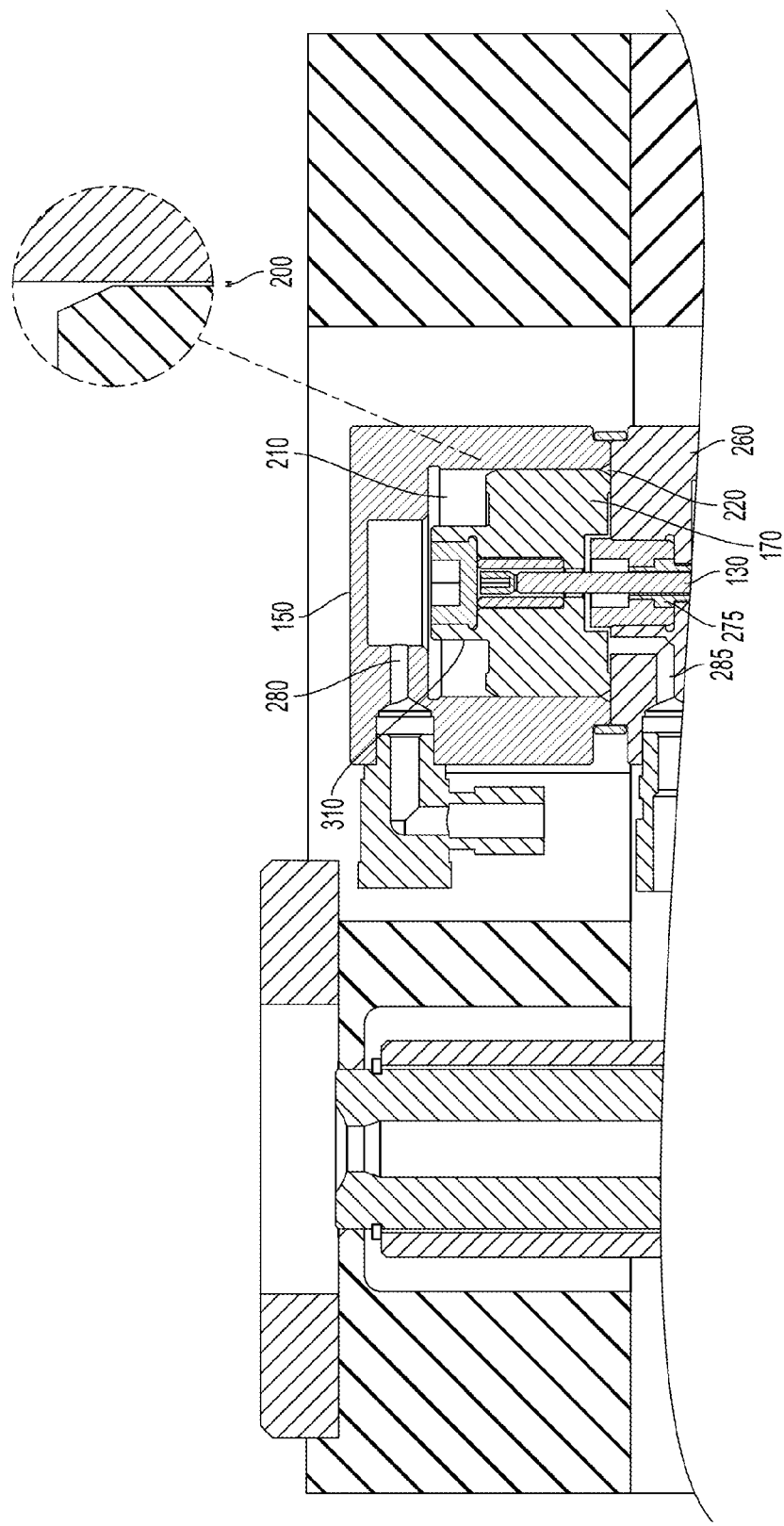
FIG. 4 is a detail view of a portion of the section of FIG. 1, showing inter alia, the microgap seal according to the invention.

As illustrated in more detail in FIGS. 2 and 4, the piston 170 has an uninterrupted elongate cylindrical wall 180, that may be chamfered on either end. The uninterrupted wall 180 is defined explicitly to mean that no features or modifications are required of the piston 170 to hold or otherwise support an elastomeric (or similar material) seal between the cylinder 160 and the piston 170. The benefit of providing this described arrangement between the cylinder 160 and the piston 170 is two-fold. Alternatively, the cylindrical wall 180 may have one or more grooves (not shown) machined into an outer surface thereof. The one or more grooves are preferably sized and otherwise dimensioned to capture any impurities, dirt or other particles that may find their way into the microgap. In order to maintain the sealing of the microgap, these grooves are preferably in the range of 50-100 microns in width.

First, without the use of seals, the piston-cylinder arrangement can be provided without the need to every open the cylinder for maintenance or to inspect the seals periodically—that is, the failure of seals is not a consideration and machine downtime due to issues with the valve gate are minimized. In line with this, no lubrication is required within the cylinder, thereby also substantially eliminating the need for any maintenance within the cylinder. Secondly, by eliminating these seals, the valve gate is not responsive to temperature effects. Prior art arrangements required insulated valve gates, and/or accommodations had to be made in routing the melt distribution channel to maximize the distance between the piston-cylinder and the melt distribution channel. Applicant's invention, on the other hand, provides for smaller injection molding arrangements to be made possible, while minimizing the maintenance and inspection required of the valve gate as there are no temperature sensitive seals that are prone to failure.

There is still a need to provide sealing functionality between the piston 170 and the cylinder 160 so that the piston 170 can be actuated and retracted, for example pneumatically via air inlets/outlets 190a and 190b. The illustrated inlets/outlets 190a and 190b are shown to have pneumatic fittings to provide compressed air into respective chambers of the cylinder. Other hardware and adaptations may be used to active the cylinder. Sealing is accomplished by providing an inner diameter of the cylinder chamber 160 and the outer diameter of the uninterrupted sidewall 180 of the piston 170 to be sized and otherwise dimensioned such that a microgap seal 200 (shown in FIG. 4) is present between the uninterrupted sidewall 180 and between the chamber of the cylinder. The microgap seal 200 is present between an upper chamber 210 and a lower chamber 220 of the cylinder. Preferably, the microgap seal is between 1 and 10 microns in width, and more preferably about between 4 and 6 microns. Applicant has tested this microgap seal in the described arrangement with a typical operating pressure of 5-10 bar, with test results showing a leak of less than about 100 mL/min. In operation, this results in effectively no, or negligible leakage over 1,000,000 cycles of the piston at 200-400 degrees Celsius operating temperature within the gate valve main assembly. The piston 170 and the cylinder 160 are preferably produced from materials having the same, or very similar thermal expansion factors. Due to the operating temperatures in the mold, as elsewhere described, it is beneficial to avoid the possibility that during sustained temperature spikes, the cylinder and piston expand to a different degree, resulting in a loss of the microgap seal, or alternatively, in jamming of the piston within the cylinder.

The microgap seal is effective for the small range of motion required of the valve gate stem, in combination with the operating pressures present in such valve gate seals.

Various details of the preferred implementation of the invention will now be described, that provide additional benefits over the prior art and aim to be particularly beneficial when used in combination with the microgap seal described above. Cylinder 150 generally includes an interior cylinder chamber 155 provided in a chamber housing 230. Chamber housing 230 has a closed top end 240 and an open bottom end 250. A housing cap 260 is provided for enclosing the bottom end, and thereby defining the cylinder chamber. In particular, a bottom chamber 220 is defined between the housing cap 260 and a bottom surface 172 of the piston 170, and an upper chamber 210 is defined between a top surface 174 of the piston 170 and an interior surface 157 of the closed top end 240. The housing cap 260 further includes a valve stem bore 270 through which the valve stem 130 extends out of the chamber housing 230. Situated within the valve stem bore is a stem bushing 275 that is held in place by plate 390 (shown in FIG. 1, and described in more detail below). The stem bushing 275 further supports the valve stem 130 in its floating arrangement. In addition, the stem busing 275 provides a seal preventing melt from entering into the valve gate. As the valve stem 130 undergoes axial movement, there is a tendency for small amounts of melt to traverse the valve stem 130, as pressure in the melt channel can be as high as between 600-2000 bar. The stem busing 275 thus seals melt out by having a honed high tolerance bore in the micro range between it and the valve stem 130 that prevents melt from traversing further up the valve stem 130.

The chamber housing 230 includes a first air passage 280 for receiving and evacuating pressurized gas into and out of the upper chamber 210. The housing cap 260 includes a second air passage 285 for receiving and evacuating pressurized gas into and out of the lower chamber 220. The fittings 190a and 190b earlier described are in fluid communication with the air passages 280 and 290, respectively. Optionally, a boss potion 295 may be provided on an inner surface of the housing cap 260, and a standoff ring 300 provided between the bottom end 250 of the housing 230 and the housing cap 260. The standoff ring 300 acts as alignment ring between the housing and the housing cap. The inclusion of the boss portion 295 and standoff ring 300 as described provides for a contact surface between the housing 230 and the housing cap 260 that is more controlled, by virtue of the use of the thinner standoff ring 300 and different materials that can be used for the housing/housing cap and the ring. A backing plate 390 may be attached to the housing cap 260 such that the housing cap 260 may rest on the melt distribution manifold 60 (as shown in FIG. 1).

The piston 170 preferably includes a top boss portion 310 extending from the upper surface 174. Internally of the boss portion 310, there is provided a seat 315 for receiving a stop portion 320 of the gate valve stem 130. A boss cap 330 may be provided to enclose the stop portion 320 within the top boss portion 310. The top boss portion 310, and an internal bore 340 of the piston 170 are sized and otherwise dimensioned such that the valve gate stem 130 is able to float within the piston 170, and in particular, within the top boss portion 310. Stop portion 320 may be internally threaded to receive a threaded portion of the stem 130. This also permits the stem 130 to be height-adjustable within the top boss portion 310. Set screw 325 may be used to fix the valve stem 130 with respect to the stop portion 320. This permits for the floating arrangement of the combination of the valve stem 130 with respect to the top boss portion 310 to be maintained, while fixing the valve stem 310 with respect to the stop portion 320. A corresponding boss receptacle 350 is preferably provided in the housing 230 to accommodate the top boss portion 310. The stop portion 320 is preferably detachable from the valve gate stem 130 to facilitate installation. By providing a floating attachment for the valve gate stem 130 in the manner described, the sealing of the injection nozzle 140 can be accomplished in a consistent manner, even where impurities in the melt or non-symmetry of melt in the nozzle 90 are present. In particular, the floating attachment permits alignment of the valve gate stem 130 throughout the various bores through which it extends. This is useful in particular with respect to the microgap herein described, in that the valve gate stem 130 is not over-constrained due to the tight tolerances to which machining is required to produce the micrograp. This prevents jamming, and eliminates another possible cause of machine downtime. That is, the floating stem 130 becomes self-centering throughout the valve gate in sealing the injection nozzle 90.

Referring back now to the melt distribution manifold 50, the melt distribution channel is preferably provided such that a first channel portion 360 extends perpendicular to a central axis of the valve gate stem 130 and a second channel portion 370 that is co-axial with the central axis of the valve gate stem 130. A stem bore 380 is provided in the melt distribution manifold such that the valve gate stem 130 extends into the stem bore and into the second channel portion 370 to the injection nozzle 90. A third microgap seal may be provided between the valve gate stem 130 and the stem bore 380. In this arrangement, the valve gate can be removed entirely from the injection molding arrangement, without disassembly. Furthermore, in the event of a need to upgrade the valve gate, for example to provide for a valve with increased capacity, replacement of the valve gate is readily accomplished by disconnecting the valve gate and inserting a new one. Complex connections or interactions with portions of the mold are not required.

In use, when the flow of melt out of the injection nozzle is intended to be stopped, pressurized air is fed into the upper chamber, between the top surface of the piston and the inner surface of the housing. This forces the piston downwards, and the valve stem into the outlet of the injection nozzle where melt enters the mold. As the valve stem is self-centering, the outlet becomes completely sealed and the flow of melt into the mold is stopped. As will also now be appreciated by one skilled in the art, the implementation of the micro gap seal in the cylinder-piston arrangement as described above eliminates the need for any parts in the valve gate that are impacted by typical operating temperatures of about 200-400 degrees Celsius within injection molding arrangements. Furthermore, the elimination of the need for any lubrication in the cylinder-piston arrangement dramatically reduces the need for maintenance, inspection and replacement of seals that have plagued the injection molding industry for many years. Also, in the cases where maintenance is required for other reasons, the majority of the valve gate parts are located away from the cylinder chamber and can be inspected, maintained or replaced without having to remove the piston from the cylinder chamber. Furthermore, the invention eliminates the need for insulation around the valve gate as is prevalent in many prior art implementations, and provides for substantially greater flexibility in routing pneumatic or in positioning the melt distribution channel.

Various other hardware and related elements that are present in valve gates will be understood to be present in the arrangement illustrated, even if not explicitly described in the above description.

The scope of the claims that follow should not be limited by the preferred embodiments set forth in description of the preferred embodiments or in the examples, but should be given the broadest interpretation consistent with the description as a whole.

The invention claimed is:

1. An injection molding arrangement comprising
    a mold top clamp plate having a means for receiving a plasticizer unit;
    a manifold retainer plate supporting a heated melt distribution manifold having a melt distribution channel into which melt from said plasticizer unit is received;
    a mold cavity plate provided such that said manifold retainer plate is positioned between said mold top clamp plate and said mold cavity plate; said mold cavity plate receiving an injection nozzle in fluid communication with said melt distribution channel for receiving melt to be injected into a mold;

a valve gate stem extending into said injection nozzle and axially movable between an open position permitting melt flow and a closed position blocking melt flow;

an actuator for moving said valve gate stem between said open position and said closed position; said actuator including a cylinder chamber receiving a piston therein; said valve gate stem coupled to said piston; and said piston having an elongate cylindrical sidewall;

wherein said cylinder chamber and said piston are sized and otherwise dimensioned to provide a microgap seal along said elongate cylindrical sidewall between an upper chamber of said cylinder chamber and a lower chamber of said cylinder chamber;

and wherein said micro gap seal provides for a distance between said piston and a wall of said cylinder chamber of less than 10 microns.

2. An injection molding arrangement according to claim 1, further comprising a bore extending from said mold top clamp plate through said manifold retainer plate for receiving said actuator therein.

3. An injection molding arrangement according to claim 1, wherein said cylinder chamber is provided in a chamber housing having a closed top end and an open bottom end; and further comprising a housing cap for enclosing said bottom end thereby defining said lower chamber between said housing cap and a bottom surface of said piston; said housing cap having a valve bore for which said valve gate stem can pass through.

4. An injection molding arrangement according to claim 3, wherein said housing includes a first air passage for receiving and evacuating pressurized gas into and out of said upper chamber; and said housing cap includes a second air passage for receiving and evacuating pressurized gas into and out of said lower chamber.

5. An injection molding arrangement according to claim 3, further comprising a stand-off between said bottom end of said housing and said housing cap; said housing cap including a boss portion extending into an interior of said stand-off; and further comprising a second microgap seal between an interior surface of said stand-off and said boss portion.

6. An injection molding apparatus according to claim 1, wherein said melt distribution channel comprises a first channel portion perpendicular to an axis of said valve gate stem and a second channel portion co-axial with said axis of said valve gate stem; and wherein a stem bore is provided in said melt distribution manifold such that said valve gate stem extends into said stem bore and into said second channel portion to said injection nozzle.

7. An injection molding apparatus according to claim 6, further comprising a third microgap seal between said valve gate stem and said stem bore.

8. An injection molding apparatus according to claim 1, wherein said piston comprises a top boss portion having a seat for receiving a stop portion of said valve gate stem and a boss cap for enclosing said stop portion within said top boss potion; wherein said valve gate stem floats within said top boss portion.

9. An injection molding apparatus according to claim 1, wherein said elongate cylindrical sidewall is an uninterrupted elongate cylindrical sidewall.

10. An injection molding apparatus according to claim 1, wherein said elongate cylindrical sidewall further includes one or more grooves on an outer surface thereof, wherein said grooves are empty.

11. An injection molding apparatus according to claim 8, wherein said cylinder comprises a cylinder bore through which said valve gate stem extends out of said cylinder chamber.

12. A valve gate for use in an injection molding arrangement having an injection nozzle for injecting melt into a mold; said valve gate comprising a valve gate stem extending into the injection nozzle and axially movable between an open position permitting melt flow and a closed position blocking melt flow;

an actuator for moving said valve gate stem between said open position and said closed position; said actuator including a cylinder chamber receiving a piston therein; said valve gate stem coupled to said piston;

wherein said cylinder chamber and said piston are sized and otherwise dimensioned to provide a microgap seal along said elongate cylindrical sidewall between an upper chamber of said cylinder chamber and a lower chamber of said cylinder chamber;

and wherein said micro gap seal provides for a distance between said piston and a wall of said cylinder chamber of less than 10 microns.

13. A valve gate according to claim 12, wherein said cylinder chamber is provided in a chamber housing having a closed top end and an open bottom end; and further comprising a housing cap for enclosing said bottom end thereby defining said lower chamber between said housing cap and a bottom surface of said piston; said housing cap having a valve bore for which said valve gate stem can pass through.

14. A valve gate according to claim 13, wherein said housing includes a first air passage for receiving and evacuating pressurized gas into and out of said upper chamber; and said housing cap includes a second air passage for receiving and evacuating pressurized gas into and out of said lower chamber.

15. A valve gate according to claim 13, further comprising a stand-off between said bottom end of said housing and said housing cap; said housing cap including a boss portion extending into an interior of said stand-off; and further comprising a second microgap seal between an interior surface of said stand-off and said boss portion.

16. A valve gate according to claim 12, wherein said piston comprises a top boss portion having a seat for receiving a stop portion of said valve gate stem and a boss cap for enclosing said stop portion within said top boss potion; wherein said valve gate stem floats within said top boss portion.

17. A valve gate according to claim 16, wherein said cylinder comprises a cylinder bore through which said valve gate stem extends out of said cylinder chamber.

18. A valve gate according to claim 12, wherein said elongate cylindrical sidewall is an uninterrupted elongate cylindrical sidewall.

19. An injection molding apparatus according to claim 12, wherein said elongate cylindrical sidewall further includes one or more grooves on an outer surface thereof, wherein said grooves are empty.

* * * * *